DANIEL A. JOHNSON.
Improvement in Wheel-Rims.

No. 114,565. Patented May 9, 1871.

United States Patent Office.

DANIEL A. JOHNSON, OF BOSTON, MASSACHUSETTS.

Letters Patent No. 114,565, dated May 9, 1871; antedated May 1, 1871.

IMPROVEMENT IN WHEEL-RIMS.

The Schedule referred to in these Letters Patent and making part of the same.

I, DANIEL A. JOHNSON, of Boston, in the county of Suffolk and State of Massachusetts, have invented certain Improvements in Wheel-Rims, of which the following is a specification.

Figure 1:
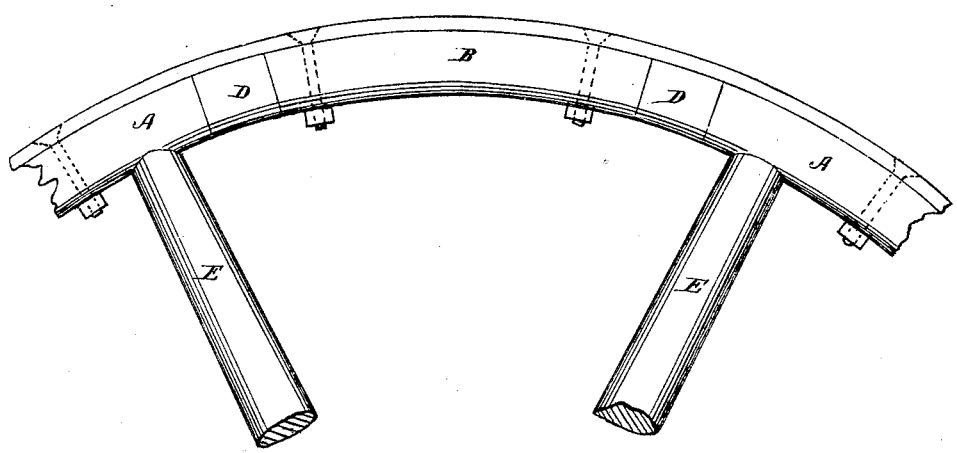

Figure 1 shows a side elevation of my invention, and

Figure 2:
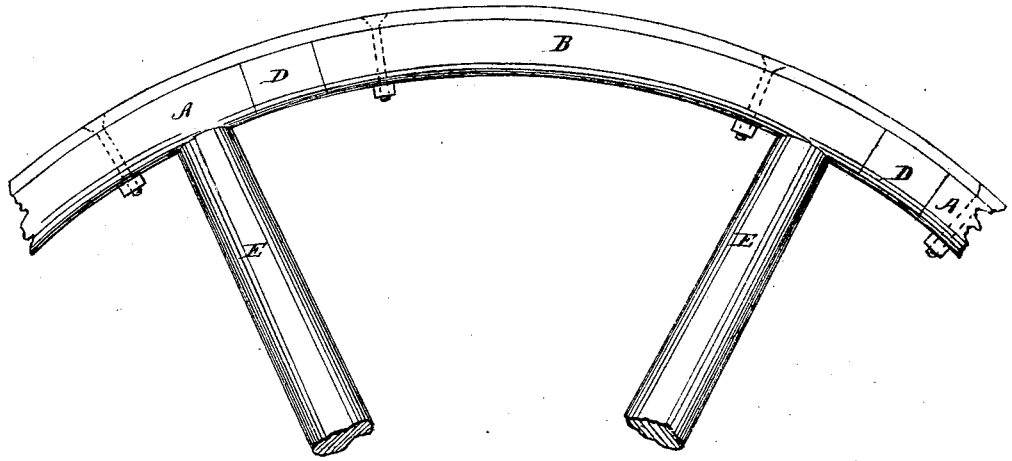

Figure 2 a similar view of a modification, or another method of arrangement.

The object of my invention is to produce a joint for fellies of wheels that cannot be easily bent or injured by use, or if bent or otherwise injured, can be easily and cheaply repaired.

The fellies of light wheels, when bent stuff is used, are joined midway between two spokes at two points in the rim opposite each other. This construction gives a weak rim, and one always liable to bend inward at the joint.

Wheelwrights have endeavored to overcome this objection, and in an invention patented by myself, July 30, 1861, I attempted the removal of the evils spoken of by joining the fellies at the point where a spoke enters the rim.

In practice and upon experience I find this does not answer the purpose, as there is not strength enough to the rim. I have therefore invented an improvement upon my former invention, and practical tests assure me of its merit.

The nature of my invention consists in a double joint of the fellies upon each side of the wheel, or rather in a section of rim between the main rim pieces, so adjusted that the joints come near a spoke, which acts as an abutment to the bridge of the rim.

In the drawing—

A A are the main pieces of a bent rim or fellies, each extending usually half the circumference of the wheel.

B is a section of rim jointed at each end to the main pieces A A by the common bands D D.

This section occupies nearly the whole distance between the spokes E E.

By this construction great strength is secured, the ends of main pieces A, extending so short a distance past the spokes, still giving the ordinary means of tenoning the spoke without impairing the strength at this point, leaving no chance, or but little, of the bending in of the fellies at the joints, for the piece B cannot bend, and the parts of the rim A A, being so short past the spokes, have not much liability to spring, as they are so near the fulcrum of the spokes; but should the section B be sprung by some severe blow upon the tire it is easily replaced without disturbing the long main fellies A, while in wheels constructed in the ordinary manner, if the rim becomes bent in the joint, the repair necessitates the replacing of the whole half-rim A.

The bands D D are of the ordinary kind used in tying the joints of fellies.

Instead of the arrangement above described the one shown in fig. 2 may be employed, in which the section B commences near one spoke and passes over just beyond the next or second one. This modification of my improvement effects the purpose just as well.

It is apparent, then, that I overcome the faults of the ordinary methods of joining the fellies of light carriage-wheels when bent rims are used.

The expense is slightly increased in the construction, but it is saved many times over in the repairing of wheels.

The sections B are employed upon each side of the wheel opposite each other, as the halves of the rim are joined; or, should the rim be in three main pieces, of course I should use three sections.

Having thus fully described my invention,

What I claim as new, and desire to secure by Letters Patent, is—

The section D, when interposed between and suitably connected with the extremities of two main pieces of a wheel-rim, and located between two spokes, with its ends so near the ends of the spokes that the latter serve as bearings for the section, substantially as described.

In testimony whereof I have signed my name to this specification in the presence of two subscribing witnesses.

DANIEL A. JOHNSON.

Witnesses:
   CARROLL D. WRIGHT,
   CHARLES F. BROWN.